US011637297B2

(12) United States Patent
Hosoi et al.

(10) Patent No.: US 11,637,297 B2
(45) Date of Patent: Apr. 25, 2023

(54) FUEL CELL SYSTEM

(71) Applicants: TOYOTA JIDOSHA KABUSHIKI KAISHA, Toyota (JP); AISIN CORPORATION, Kariya (JP)

(72) Inventors: Takami Hosoi, Aichi-gun (JP); Hiroaki Nishiumi, Toyota (JP); Takashi Mishima, Kariya (JP); Hitoshi Okuno, Kariya (JP); Toshihide Yamada, Kariya (JP)

(73) Assignees: TOYOTA JIDOSHA KABUSHIKI KAISHA, Toyota (JP); ASIN CORPORATION, Kariya (JP)

( * ) Notice: Subject to any disclaimer, the term of this patent is extended or adjusted under 35 U.S.C. 154(b) by 0 days.

(21) Appl. No.: 17/450,281

(22) Filed: Oct. 7, 2021

(65) Prior Publication Data

US 2022/0115679 A1    Apr. 14, 2022

(30) Foreign Application Priority Data

Oct. 9, 2020    (JP) .............................. JP2020-170862

(51) Int. Cl.
| | |
|---|---|
| *H01M 8/04119* | (2016.01) |
| *H01M 8/04223* | (2016.01) |
| *H01M 8/04082* | (2016.01) |
| *H01M 8/04291* | (2016.01) |
| *H01M 8/1004* | (2016.01) |

(52) U.S. Cl.
CPC ... *H01M 8/04164* (2013.01); *H01M 8/04201* (2013.01); *H01M 8/04253* (2013.01); *H01M 8/04291* (2013.01); *H01M 8/1004* (2013.01); *H01M 2250/20* (2013.01)

(58) Field of Classification Search
CPC ......... H01M 8/04164; H01M 8/04253; H01M 8/04291; H01M 8/1004
See application file for complete search history.

(56) References Cited

U.S. PATENT DOCUMENTS

| | | |
|---|---|---|
| 2019/0252701 A1 | 8/2019 | Okamura et al. |
| 2019/0302591 A1 | 10/2019 | Nojima |
| 2019/0363375 A1 | 11/2019 | Hosoi et al. |

FOREIGN PATENT DOCUMENTS

| | | | |
|---|---|---|---|
| JP | 2018-041539 | * | 3/2018 |
| JP | 2018041539 A | | 3/2018 |

(Continued)

*Primary Examiner* — Brittany L Raymond
(74) *Attorney, Agent, or Firm* — Hunton Andrews Kurth LLP

(57) ABSTRACT

A fuel cell system includes a fuel cell, a cathode off-gas discharge channel, a gas-liquid separator, and a cover member. The gas-liquid separator includes a body, a first discharge channel including a first valve seat at an end, and a first valve device including a first valve element and a first driver. The cover member covers at least the first discharge channel and the first valve seat in the gas-liquid separator, and includes a gas channel defining portion that defines a gas channel communicating with the cathode off-gas discharge channel between the cover member and the gas-liquid separator. The gas channel is configured such that a cathode off-gas flowing into the cover member comes into contact with the first discharge channel and the first valve seat and does not come into contact with the first driver.

8 Claims, 11 Drawing Sheets

(56) References Cited

FOREIGN PATENT DOCUMENTS

| JP | 2019139935 A | 8/2019 |
| JP | 2019175570 A | 10/2019 |
| JP | 2019204731 A | 11/2019 |

* cited by examiner

FUEL CELL SYSTEM

CROSS-REFERENCE TO RELATED APPLICATION

This application claims priority to Japanese Patent Application No. 2020-170862 filed on Oct. 9, 2020, incorporated herein by reference in its entirety.

BACKGROUND

1. Technical Field

The present disclosure relates to a fuel cell system.

2. Description of Related Art

In fuel cells, an anode reactive gas and a cathode reactive gas are supplied, and electric power is generated through electrochemical reaction using those reactive gases. A part of the anode reactive gas supplied to the fuel cell, such as a hydrogen gas, is not used in the electrochemical reaction, but is discharged as a part of an anode off-gas. To improve fuel efficiency, the following structure may be employed. A gas-liquid separator is provided on a downstream side of the anode of the fuel cell to separate the anode off-gas into a gas component and water. The obtained gas component is supplied to the fuel cell again, and the water is discharged. In this structure, a valve device for draining water from the gas-liquid separator may be frozen under a low-temperature environment, and the drainage may be hindered. In view of this, there is proposed a structure in which a valve device is arranged in a cathode off-gas discharge pipe and is warmed by a high-temperature cathode off-gas discharged from a fuel cell (see Japanese Unexamined Patent Application Publication No. 2018-41539 (JP 2018-41539 A)).

SUMMARY

The structure described in JP 2018-41539 A is excellent in that the freezing of the valve device can be prevented. Since the fuel cell system is used in various environments, a further improvement is demanded from the viewpoint of improving the durability of the fuel cell system including the valve device of the gas-liquid separator and the reliability of the operation of the valve device.

The present disclosure can be implemented in the following aspects.

According to one aspect of the present disclosure, a fuel cell system is provided. The fuel cell system includes a fuel cell, a cathode off-gas discharge channel, a gas-liquid separator, and a cover member. The cathode off-gas discharge channel is connected to the fuel cell, and is configured such that a cathode off-gas discharged from the fuel cell passes through the cathode off-gas discharge channel. The gas-liquid separator is configured such that an anode off-gas discharged from the fuel cell flows into the gas-liquid separator and water is separated from the anode off-gas. The gas-liquid separator includes a hollow body, a first discharge channel, and a first valve device. The body is configured to store the water. The first discharge channel is connected to a lower part of the body, includes a first valve seat at an end of the first discharge channel, and is configured to discharge at least the water stored in the body. The first valve device includes a first valve element and a first driver. The first valve element is configured to come into contact with the first valve seat and adjust an opening degree of the first discharge channel. The first driver is configured to drive the first valve element. The cover member is configured to cover at least the first discharge channel and the first valve seat in the gas-liquid separator, and includes a gas channel defining portion that defines a gas channel communicating with the cathode off-gas discharge channel between the cover member and the gas-liquid separator. The gas channel is configured such that the cathode off-gas flowing into the cover member comes into contact with the first discharge channel and the first valve seat and does not come into contact with the first driver. According to the fuel cell system of this aspect, the gas channel defined by the cover member is configured such that the cathode off-gas flowing into the cover member comes into contact with the first discharge channel and the first valve seat and does not come into contact with the first driver. Therefore, progress of corrosion of the first driver can be suppressed while suppressing freezing of the valve device by warming the first discharge channel and the first valve seat by using the cathode off-gas flowing into the cover member. Thus, it is possible to improve the durability of the fuel cell system including the valve device and the reliability of the operation of the valve device.

In the fuel cell system of the aspect described above, the gas-liquid separator may further include a second discharge channel and a second valve device. The second discharge channel is connected to the body above the first discharge channel, includes a second valve seat at an end of the second discharge channel, and is configured to discharge at least a gas component in the anode off-gas. The second valve device includes a second valve element and a second driver. The second valve element is configured to come into contact with the second valve seat and adjust an opening degree of the second discharge channel. The second driver is configured to drive the second valve element. The cover member may be configured to further cover the second discharge channel and the second valve seat. The fuel cell system of this aspect includes the second discharge channel connected to the body of the gas-liquid separator above the first discharge channel. Therefore, the anode off-gas can be discharged from the second discharge channel even in a situation in which the anode off-gas cannot be discharged from the first discharge channel because the first discharge channel or the first valve seat is frozen due to the water stored in the body. The cover member further covers the second discharge channel and the second valve seat. Therefore, the second discharge channel and the second valve seat can be warmed in addition to the first discharge channel and the first valve seat by using the cathode off-gas flowing into the cover member.

In the fuel cell system of the aspect described above, the second discharge channel may be connected to the body above a water level indicating a predetermined water storage amount in the body. According to the fuel cell system of this aspect, the second discharge channel is connected to the body of the gas-liquid separator above the water level indicating the predetermined water storage amount in the body. By appropriately setting the water level, it is possible to suppress freezing of the second discharge channel and the second valve element by reducing the occurrence of a case where the water stored in the body comes into contact with the second discharge channel.

The fuel cell system of the aspect described above may further include a cathode reactive gas supply device, a cathode reactive gas supply channel, and a bypass channel. The cathode reactive gas supply device is configured to supply a cathode reactive gas to the fuel cell. The cathode reactive gas supply channel connects the cathode reactive gas supply device and the fuel cell, and is configured to guide the cathode reactive gas to the fuel cell. The bypass channel is connected to the cathode reactive gas supply channel, and is configured such that the cathode reactive gas supplied from the cathode reactive gas supply device passes through the bypass channel without passing through the fuel cell. The cover member may be connected to the bypass channel. The gas channel may be configured such that the cathode reactive gas flows into the gas channel from the bypass channel. According to the fuel cell system of this aspect, the cover member is connected to the bypass channel, and the cathode reactive gas flows into the gas channel from the bypass channel. Therefore, the cathode reactive gas passing through the bypass channel can be introduced into the cover member, and the first discharge channel and the first valve seat can further be warmed by using the cathode reactive gas. The cathode reactive gas passing through the bypass channel does not contribute to electric power generation in the fuel cell. Therefore, the flow rate of the cathode reactive gas can freely be controlled independently of the status of electric power generation in the fuel cell. According to the fuel cell system of this aspect, the temperature increase of the first discharge channel and the first valve seat can be controlled accurately.

In the fuel cell system of the aspect described above, the gas channel may be configured such that the cathode reactive gas flowing into the cover member from the bypass channel comes into contact with the first discharge channel, the first valve seat, the second discharge channel, and the second valve seat and does not come into contact with the first driver and the second driver. According to the fuel cell system of this aspect, the gas channel is configured such that the cathode reactive gas flowing into the cover member from the bypass channel comes into contact with the first discharge channel, the first valve seat, the second discharge channel, and the second valve seat and does not come into contact with the first driver and the second driver. Therefore, the first discharge channel, the first valve seat, the second discharge channel, and the second valve seat can directly be warmed by using the cathode reactive gas flowing into the cover member.

The fuel cell system of the aspect described above may further include a cathode reactive gas supply device, a cathode reactive gas supply channel, and a bypass channel. The cathode reactive gas supply device is configured to supply a cathode reactive gas to the fuel cell. The cathode reactive gas supply channel connects the cathode reactive gas supply device and the fuel cell, and is configured to guide the cathode reactive gas to the fuel cell. The bypass channel is connected to the cathode reactive gas supply channel, and is configured such that the cathode reactive gas supplied from the cathode reactive gas supply device passes through the bypass channel without passing through the fuel cell. The bypass channel may be connected to the cathode off-gas discharge channel on an upstream side of a portion connected to the cover member in the cathode off-gas discharge channel. The gas channel may be configured such that a gas mixture flowing into the gas channel and containing the cathode off-gas and the cathode reactive gas passing through the bypass channel comes into contact with the first discharge channel and the first valve seat and does not come into contact with the first driver. According to the fuel cell system of this aspect, the bypass channel is connected to the upstream side of the portion connected to the cover member in the cathode off-gas discharge channel, and the gas channel is configured such that the gas mixture flowing into the gas channel and containing the cathode off-gas and the cathode reactive gas passing through the bypass channel comes into contact with the first discharge channel and the first valve seat and does not come into contact with the first driver. Therefore, the first discharge channel and the first valve seat can be warmed by using the gas mixture flowing into the cover member, and the progress of corrosion of the first driver can be suppressed. The cathode reactive gas passing through the bypass channel does not contribute to electric power generation in the fuel cell. Therefore, the flow rate of the cathode reactive gas can freely be controlled independently of the status of electric power generation in the fuel cell. According to the fuel cell system of this aspect, the temperature increase of the first discharge channel and the first valve seat can be controlled accurately.

In the fuel cell system of the aspect described above, the gas-liquid separator may further include a surrounding portion projecting from a side of the body, having an opening, and configured to surround the first discharge channel and the first valve seat. The cover member may face the surrounding portion, and may be connected to the gas-liquid separator to close the opening. A bottom face of the surrounding portion may be inclined downward with decreasing distance to the cover member. According to the fuel cell system of this aspect, the bottom face of the surrounding portion is inclined downward with decreasing distance to the cover member. Therefore, the water discharged from the first discharge channel can be moved to the cover member and easily discharged through an outlet together with the cathode off-gas.

The present disclosure may be implemented in various aspects. For example, the present disclosure may be implemented in various aspects such as a gas-liquid separator set including a gas-liquid separator and a cover member assembled together, and a vehicle including a fuel cell system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

A1. Overall Structure of System

Figure 1:
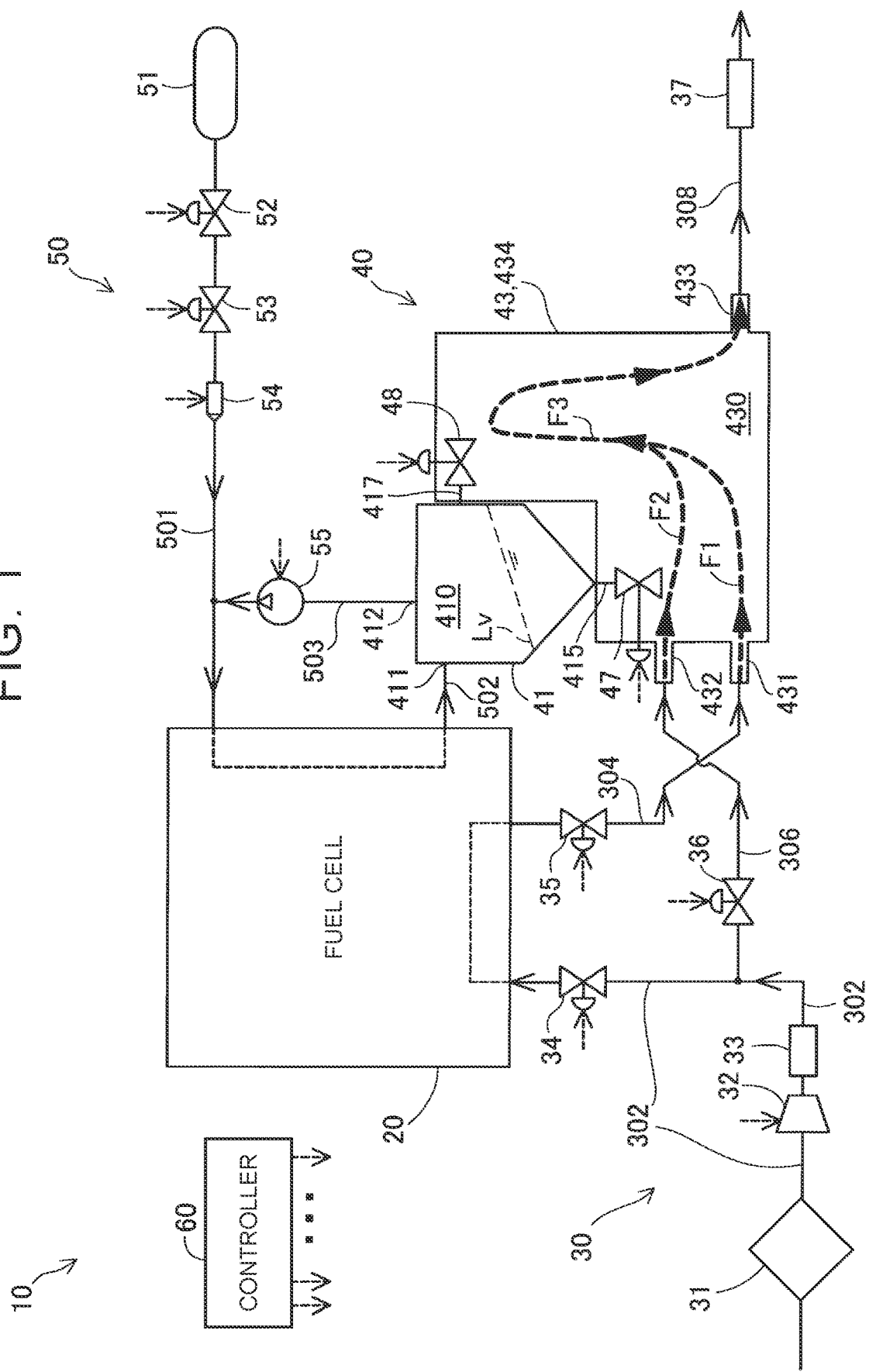
FIG. 1 is a block diagram illustrating the overall structure of a fuel cell system according to one embodiment of the present disclosure.

FIG. 1 is a block diagram illustrating the overall structure of a fuel cell system 10 according to one embodiment of the present disclosure. In this embodiment, the fuel cell system 10 is mounted on a vehicle, and supplies electric power to a traction motor and various auxiliary devices. The fuel cell system 10 includes a fuel cell 20, a cathode-side gas supply/discharge system 30, an anode-side supply/discharge system 50, a gas-liquid separator set 40, and a controller 60.

The fuel cell 20 is also called "fuel cell stack", and has a structure in which a plurality of single cells each serving as a power generation element is stacked. Each single cell is a so-called polymer electrolyte fuel cell configured to generate electric power by being supplied with a hydrogen gas serving as an anode reactive gas and air serving as a cathode reactive gas. Each single cell includes a membrane electrode assembly and a pair of separators. The membrane electrode assembly includes electrodes arranged on both sides of a proton exchange membrane having ionic conductivity. The separators sandwich the membrane electrode assembly. A channel through which the hydrogen gas flows is formed between the membrane electrode assembly and the separator on the anode side. A channel through which the air flows is formed between the membrane electrode assembly and the separator on the cathode side.

The cathode-side gas supply/discharge system 30 supplies air serving as the cathode reactive gas to the fuel cell 20, and discharges a cathode off-gas from the fuel cell 20. The cathode off-gas contains water generated through electrochemical reaction in the cathode of each single cell.

The cathode-side gas supply/discharge system 30 includes a cathode reactive gas supply channel 302, a cathode off-gas discharge channel 304, a bypass channel 306, a discharge channel 308, an air cleaner 31, an air compressor 32 serving as a cathode reactive gas supply device, an intercooler 33, a sealing valve device 34, a pressure regulating valve device 35, a bypass valve device 36, and a muffler 37.

The cathode reactive gas supply channel 302 connects the air compressor 32 and the fuel cell 20, and guides air (compressed air) to the fuel cell 20. The cathode off-gas discharge channel 304 connects the fuel cell 20 and a cover member 43 of the gas-liquid separator set 40 described later. A cathode off-gas discharged from the fuel cell 20 passes through the cathode off-gas discharge channel 304. The bypass channel 306 is connected to a downstream side of the intercooler 33 in the cathode reactive gas supply channel 302. The bypass channel 306 is also connected to the cover member 43 of the gas-liquid separator set 40 described later. Air supplied from the air compressor 32 passes through the bypass channel 306 without passing through the fuel cell 20. The discharge channel 308 is connected to the cover member 43 of the gas-liquid separator set 40 described later. Gas (gas mixture described later) and water discharged from the gas-liquid separator set 40 pass through the discharge channel 308. Each of the channels 302 to 308 is formed by one or more pipes.

The air cleaner 31 is arranged on an upstream side of the air compressor 32 in the cathode reactive gas supply channel 302, and removes foreign objects in air to be supplied to the fuel cell 20. The air compressor 32 is arranged on a downstream side of the air cleaner 31 and on an upstream side of the intercooler 33, and compresses and discharges air flowing into the air compressor 32 via the air cleaner 31. The intercooler 33 is arranged on a downstream side of the air compressor 32 in the cathode reactive gas supply channel 302, and cools and discharges air whose temperature is increased through adiabatic compression in the air compressor 32. The sealing valve device 34 is arranged in the cathode reactive gas supply channel 302 on a downstream side of a portion connecting the cathode reactive gas supply channel 302 and the bypass channel 306. The sealing valve device 34 adjusts the flow rate of air that flows into the fuel cell 20. The pressure regulating valve device 35 is arranged in the cathode off-gas discharge channel 304, and adjusts a cathode-side pressure (back pressure) of the fuel cell 20. The bypass valve device 36 is arranged in the bypass channel 306, and adjusts the flow rate of air passing through the bypass channel 306. The opening degree of the bypass valve device 36, the opening degree of the sealing valve device 34, and the rotation speed of the air compressor 32 are controlled to appropriately control the flow rate of air to be supplied to the fuel cell 20 and the flow rate of air that passes through the bypass channel 306.

The gas-liquid separator set 40 includes a gas-liquid separator 41 and the cover member 43 assembled together.

An anode off-gas discharged from the fuel cell 20 flows into the gas-liquid separator 41. For example, the anode off-gas contains a hydrogen gas supplied to each single cell but remaining without being used in the electrochemical reaction, water vapor originating from generated water and moving from the cathode through the proton exchange membrane in each single cell, and a nitrogen gas similarly moving from the cathode through the proton exchange membrane. The gas-liquid separator 41 separates water from the incoming anode off-gas by condensing water vapor, and discharges the water to the outside. The gas-liquid separator 41 discharges, to the outside, the anode off-gas from which the water is separated, that is, a gas mainly containing the hydrogen gas.

The gas-liquid separator 41 includes a body 410, a first discharge channel 415, a first valve device 47, a second discharge channel 417, and a second valve device 48.

The body 410 has a hollow structure to define a space configured to store condensed water separated from the anode off-gas. The first discharge channel 415 is connected to a bottom end of the body 410, and discharges at least the water stored in the body 410. The description "discharges at least the water stored in the body 410" means not only a case where only the water stored in the body 410 is discharged, but also a case where only the anode off-gas in the body 410 is discharged when no water is stored, and a case where the stored water is discharged first and then the anode off-gas from which the water is separated is discharged. The first discharge channel 415 may be connected not only to the bottom end of the body 410, but also to any position in a lower part. The first valve device 47 adjusts the opening degree of the first discharge channel 415. The second discharge channel 417 is connected to the body 410 at a part above the first discharge channel 415, and discharges at least a gas component in the anode off-gas. The description "discharges at least a gas component in the anode off-gas" means not only a case where only the gas component in the anode off-gas is discharged, but also a case where water adhering to the body 410 in the vicinity of a portion connected to the second discharge channel 417 is discharged together with the anode off-gas by using a force for discharging the anode off-gas. The "gas component in the anode off-gas" may contain water vapor remaining without being condensed and separated from the off-gas. The second discharge channel 417 is connected to the body 410 above a water level indicating a predetermined water storage amount in the body 410. In this embodiment, the "predetermined water storage amount" means a maximum water storage amount expected in the body 410 during a normal operation. Specifically, as illustrated in FIG. 1, the second discharge channel 417 is connected to the body 410 at a position set above an upper end of a water surface Lv inclined from a horizontal direction by traveling of the vehicle along a road having a maximum expected inclination in a state in which water is stored in the body 410 by the maximum water storage amount. Thus, it is possible to avoid the occurrence of a case where the second discharge channel 417 and the second valve device 48 (second valve element 481 described later) are frozen when the water stored in the body 410 is frozen. In the fuel cell system 10, the controller 60 periodically drives the first valve device 47 to open during the normal operation to discharge the water in the body 410 through the first discharge channel 415. The "maximum water storage amount" means a maximum amount of water that can be stored within a period between valve opening and next valve opening.

The cover member 43 covers a part of the gas-liquid separator 41. More specifically, the cover member 43 covers a part of the outer face of the body 410, the first discharge channel 415, a valve element described later (first valve element 471) that is a component of the first valve device 47, the second discharge channel 417, and a valve element described later (second valve element 481) that is a component of the second valve device 48.

The cover member 43 includes a gas channel defining portion 434, a first inlet 431, a second inlet 432, and an outlet 433.

The gas channel defining portion 434 defines a gas channel 430 between the gas channel defining portion 434 and the gas-liquid separator 41. The cathode off-gas discharge channel 304 is connected to the first inlet 431. Therefore, a cathode off-gas flows into the gas channel 430 through the first inlet 431. The bypass channel 306 is connected to the second inlet 432. Therefore, air flows into the gas channel 430 through the second inlet 432. In this embodiment, the first inlet 431 out of the first inlet 431 and the second inlet 432 is located on a lower side, and the second inlet 432 out of the first inlet 431 and the second inlet 432 is located on an upper side. Since the first inlet 431 into which the cathode off-gas flows is located on the lower side, the cathode off-gas discharge channel 304 can easily be arranged between the fuel cell 20 and the cover member 43 so that the cathode off-gas discharge channel 304 is inclined downward with decreasing distance to the cover member 43. Thus, water together with the cathode off-gas can easily be discharged to the outside from the fuel cell 20. The air passing through the bypass channel 306 is dry gas having a smaller water content than that of the cathode off-gas. Thus, the second discharge channel 417 and the second valve element 481 can be warmed without causing water to adhere to the vicinity of the second discharge channel 417 and the second valve element 481.

As indicated by wide dashed arrows in FIG. 1, a flow F1 of the cathode off-gas entering the gas channel 430 through the first inlet 431 and a flow F2 of the air entering the gas channel 430 through the second inlet 432 are mixed into a flow F3 of a gas mixture. The discharge channel 308 is connected to the outlet 433. The gas mixture in the gas channel 430 is discharged to the discharge channel 308 through the outlet 433. Details of the structure of the gas-liquid separator set 40 are described later.

The anode-side supply/discharge system 50 supplies a hydrogen gas serving as the anode reactive gas to the fuel cell 20, and discharges an anode off-gas from the fuel cell 20.

The anode-side supply/discharge system 50 includes an anode reactive gas supply channel 501, an anode off-gas discharge channel 502, a circulation channel 503, a tank 51, a main stop valve device 52, a regulator 53, an injector 54, and a hydrogen pump 55.

The anode reactive gas supply channel 501 connects the tank 51 and the fuel cell 20, and guides a hydrogen gas to the fuel cell 20. An anode off-gas discharged from the fuel cell 20 passes through the anode off-gas discharge channel 502. The circulation channel 503 connects the gas-liquid separator 41 and the anode reactive gas supply channel 501, and returns, to the anode reactive gas supply channel 501, the anode off-gas from which water is separated in the gas-liquid separator 41, that is, a gas mainly containing the hydrogen gas. With this structure, the hydrogen gas supplied to the fuel cell 20 but unused in electric power generation in each single cell is used again. Thus, fuel efficiency can be improved.

The tank 51 stores a high-pressure hydrogen gas. The main stop valve device 52 is arranged on a downstream side of the tank 51 in the anode reactive gas supply channel 501, and achieves discharge and stop of the hydrogen gas from the tank 51. The regulator 53 is arranged on a downstream side of the main stop valve device 52 in the anode reactive gas supply channel 501, and adjusts a pressure on an upstream side of the injector 54. The injector 54 is arranged on a downstream side of the regulator 53 and on an upstream side of a portion connecting the anode reactive gas supply channel 501 and the circulation channel 503 in the anode reactive gas supply channel 501. The injector 54 is an on-off valve to be electromagnetically driven based on a drive period and a valve opening time set by the controller 60 to adjust the flow rate of the hydrogen gas to be supplied to the fuel cell 20. The hydrogen pump 55 is arranged in the circulation channel 503, and sends gas discharged from the gas-liquid separator 41 to the anode reactive gas supply channel 501.

The controller 60 controls the overall fuel cell system 10. The controller 60 is a computer including a central processing unit (CPU), a read-only memory (ROM), and a random-access memory (RAM). In this embodiment, the valve devices are solenoid valves, and are electrically connected to the controller 60. The controller 60 controls operations of the valve devices. The controller 60 is electrically connected to and controls the air compressor 32, the injector 54, and the hydrogen pump 55.

Although illustration is omitted, the fuel cell system 10 includes other components. Specifically, the fuel cell system 10 includes a cooling medium circulation system and a power supply system. The cooling medium circulation system adjusts the temperature of the fuel cell 20 by using a cooling medium. The power supply system steps up electric power output from the fuel cell 20, and supplies the electric power by converting the electric power into alternating current power as necessary.

A2. Details of Structure of Gas-Liquid Separator Set 40

Figure 2:
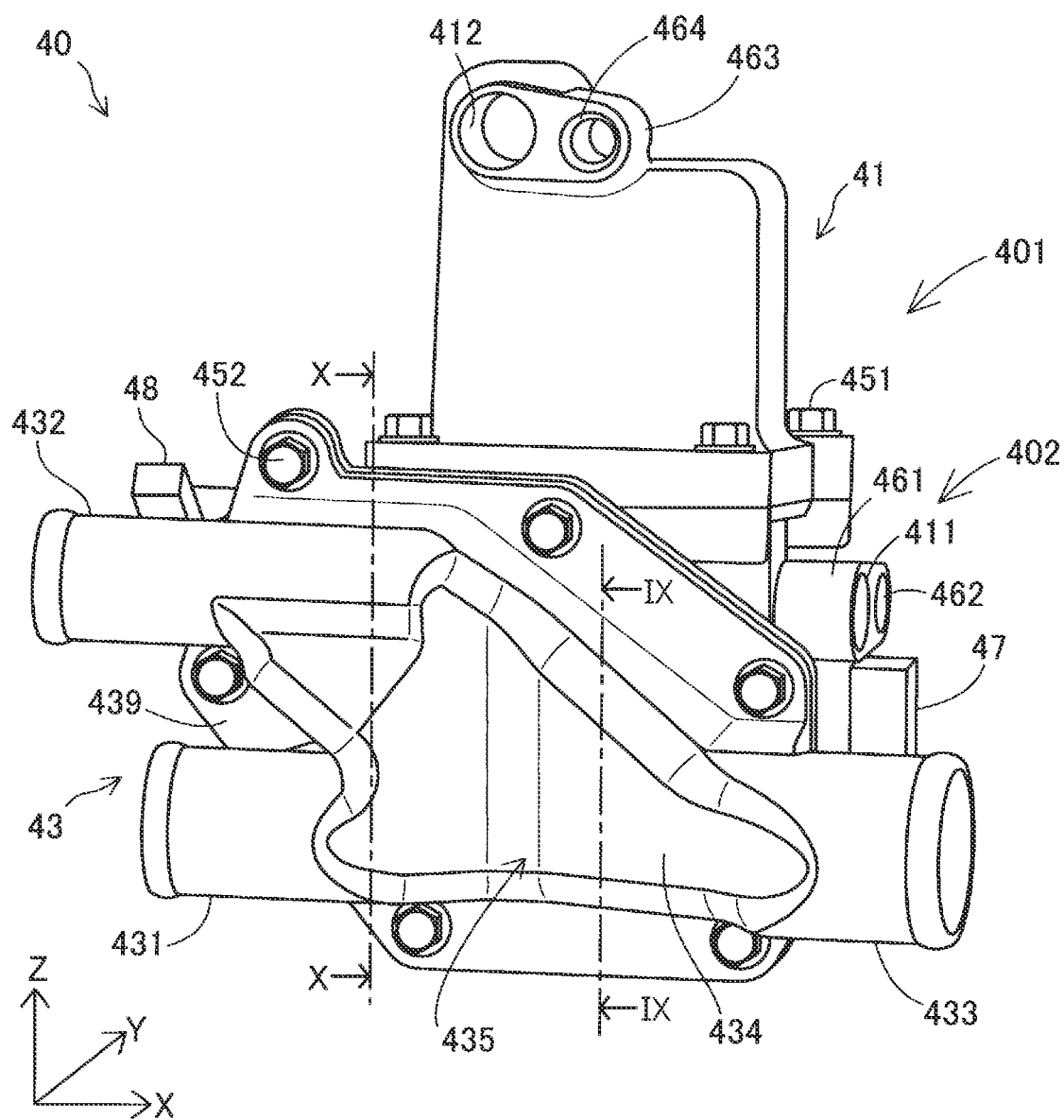
FIG. 2 is a perspective view illustrating the external structure of a gas-liquid separator set.
Figure 3:
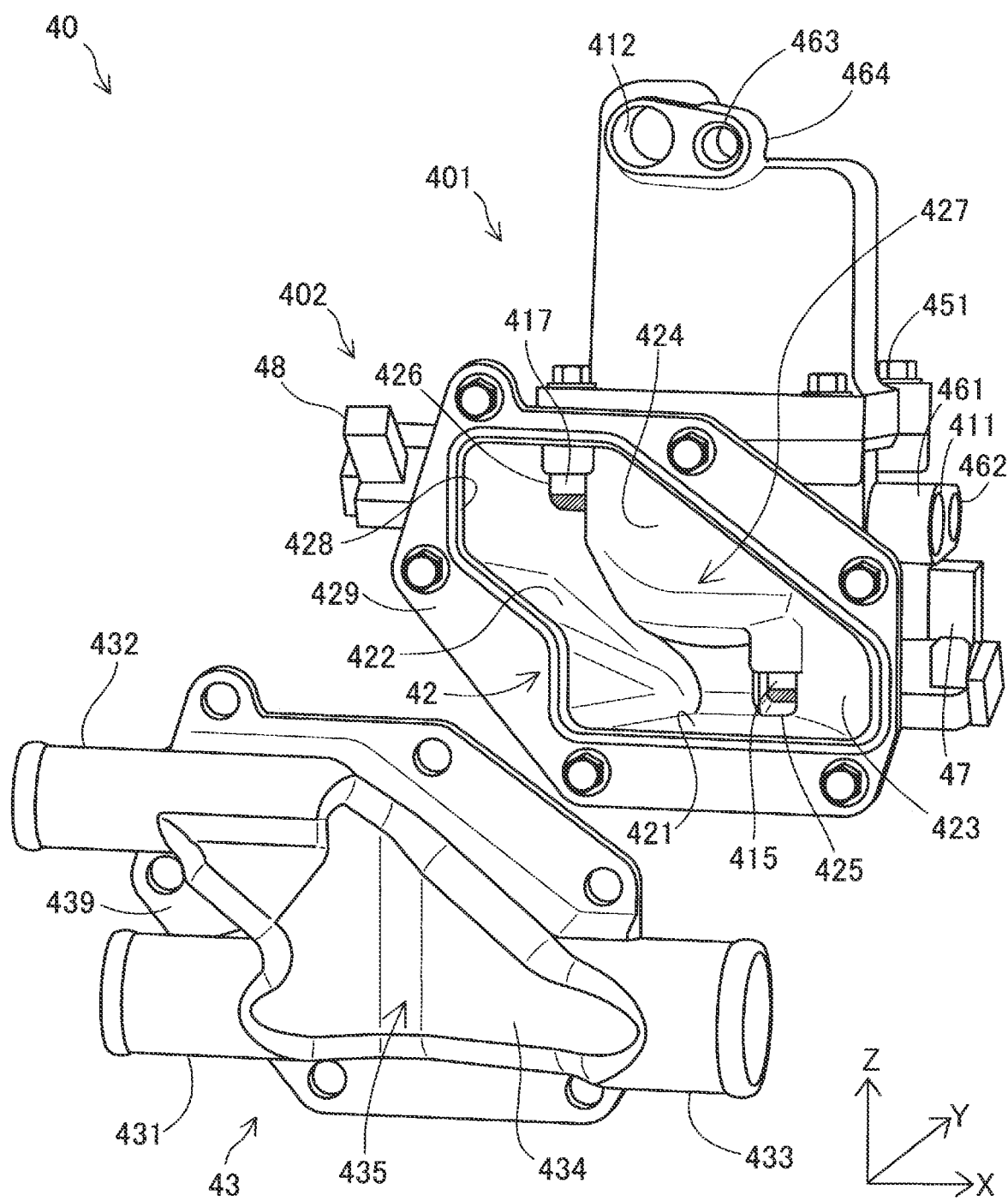
FIG. 3 is an exploded perspective view of the gas-liquid separator set.
Figure 4:
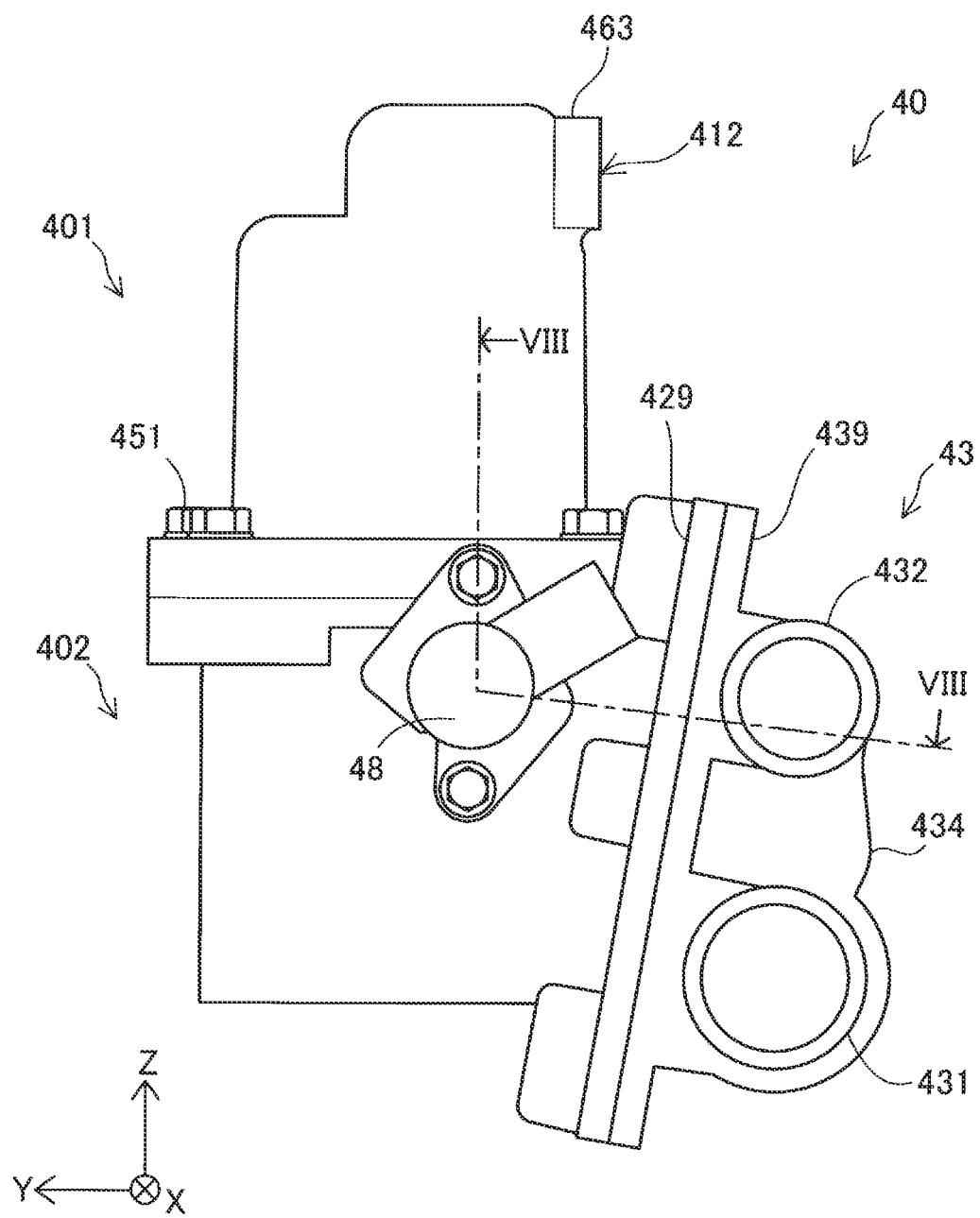
FIG. 4 is a left-hand side view of the gas-liquid separator set.
Figure 5:
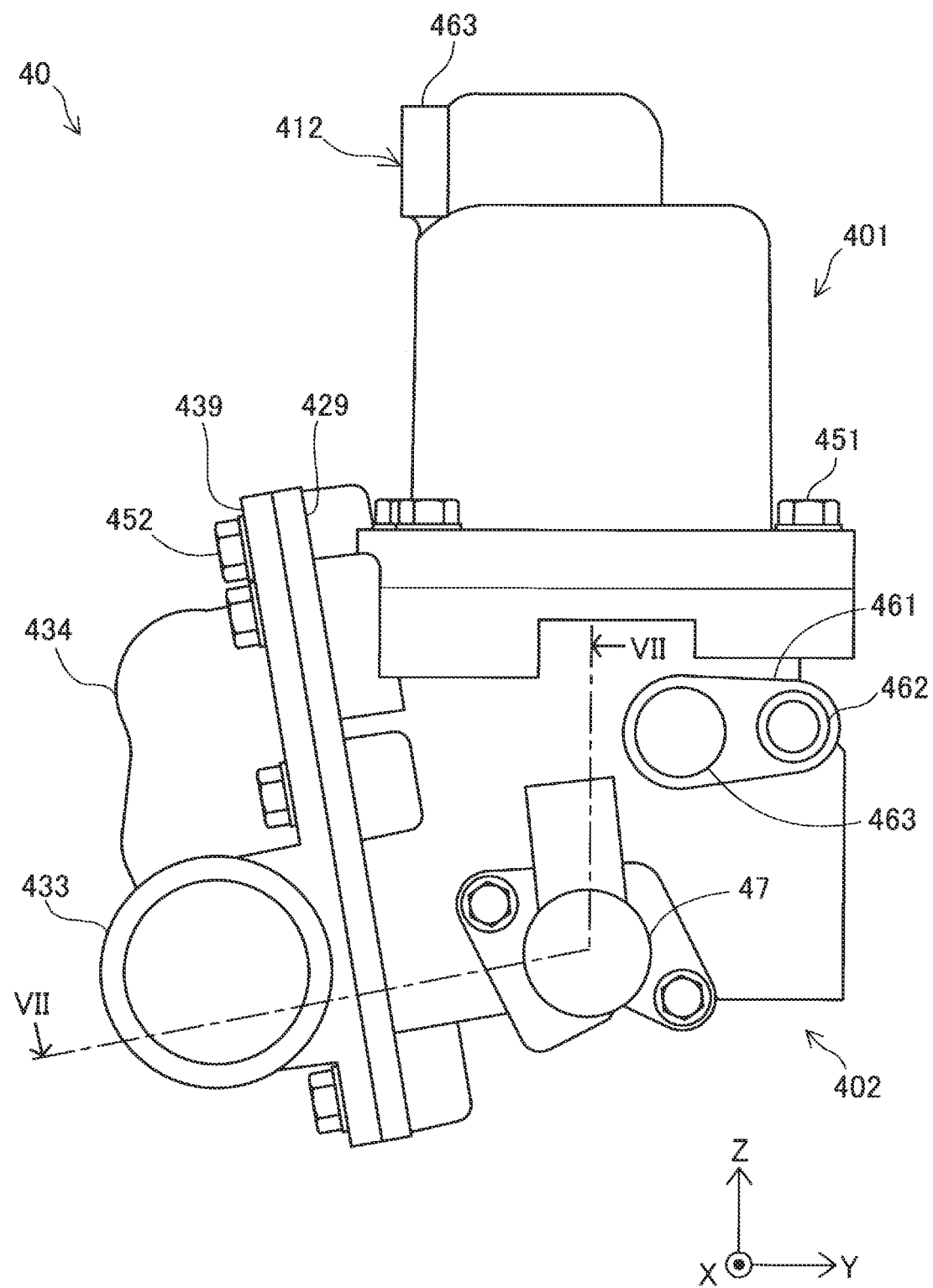
FIG. 5 is a right-hand side view of the gas-liquid separator set.

FIG. 2 is a perspective view illustrating the external structure of the gas-liquid separator set 40. FIG. 3 is an exploded perspective view of the gas-liquid separator set 40. FIG. 4 is a left-hand side view of the gas-liquid separator set 40. FIG. 5 is a right-hand side view of the gas-liquid separator set 40. FIG. 3 illustrates the gas-liquid separator 41 and the cover member 43 unjoined from each other. FIG. 2 to FIG. 5 illustrate an X axis, a Y axis, and a Z axis orthogonal to each other. In this embodiment, an "X-axis direction" means a direction encompassing a +X direction and a −X direction. Similarly, a "Y-axis direction" means a direction encompassing a +Y direction and a −Y direction, and a "Z-axis direction" means a direction encompassing a +Z direction and a −Z direction. An X axis, a Y axis, and a Z axis described later in FIG. 6, FIG. 8, and FIG. 10 correspond to the X axis, the Y axis, and the Z axis in FIG. 2 to FIG. 5, respectively. In a state in which the fuel cell system 10 is mounted on the vehicle, the +Z direction corresponds to an upwardly vertical direction. An X-Y plane is parallel to a horizon plane.

As illustrated in FIG. 2 to FIG. 5, the cover member 43 is attached to a side portion of the gas-liquid separator 41 in the −Y direction with bolts 452. The gas-liquid separator 41 has an overall structure in which an upper component 401 and a lower component 402 are arranged in line in the Z-axis direction and the two components 401 and 402 are fastened together with bolts 451. The upper component 401 is an upper part of the body 410. The lower component 402 is a lower part of the body 410.

A projection 463 is provided at the top of the upper component 401. The projection 463 has a discharge port 412 and a fixing hole 464. The circulation channel 503 omitted in FIG. 2 to FIG. 5 is connected to the discharge port 412. A nut (not illustrated) is provided in the fixing hole 464. The gas-liquid separator set 40 is fixed to a predetermined position by engaging a bolt (not illustrated) with the nut.

As illustrated in FIG. 2, FIG. 3, and FIG. 5, the lower component 402 has a projection 461. The projection 461 has an inflow port 411 and a fixing hole 462. The anode off-gas discharge channel 502 is connected to the inflow port 411. A nut (not illustrated) is provided in the fixing hole 462. The gas-liquid separator set 40 is fixed to a predetermined position by engaging a bolt (not illustrated) with the nut.

As illustrated in FIG. 4, the second valve device 48 is attached to an upper side of a side portion of the lower component 402 in the −X direction. As illustrated in FIG. 5, the first valve device 47 is attached to a lower side of a side portion of the lower component 402 in the +X direction.

As illustrated in FIG. 3 to FIG. 5, the lower component 402 has a surrounding portion 42 on a side portion in the −Y direction. The surrounding portion 42 projects in the −Y direction from the side of the body 410 (lower component 402). The surrounding portion 42 includes a cup-shaped space defining portion 427 having an opening 428 at an end in the −Y direction, and a flange 429 around the opening 428. The space defining portion 427 defines the gas channel 430 together with the gas channel defining portion 434 of the cover member 43. The outer face of the space defining portion 427 in the +Y direction is in contact with the side face of the lower component 402 in the −Y direction. The inner wall of the space defining portion 427 includes a bottom face 421, a left side face 422, a right side face 423, and a ceiling face 424. As described later, the bottom face 421 is inclined downward with decreasing distance to the cover member 43. The left side face 422 is inclined in the +X direction toward a side in the −Z direction. The space defining portion 427 has a first opening 425 and a second opening 426. The first opening 425 is located on a lower side of a portion where the bottom face 421, the right side face 423, and the ceiling face 424 intersect each other. The first discharge channel 415 and the valve element of the first valve device 47 (first valve element 471 described later) are exposed from the first opening 425. The second opening 426 is located on an upper side of a portion where the left side face 422 and the ceiling face 424 intersect each other. The second discharge channel 417 and the valve element of the second valve device 48 (second valve element 481 described later) are exposed from the second opening 426. Thus, the surrounding portion 42 is regarded as surrounding the exposed components, that is, the first discharge channel 415, the first valve element 471, the second discharge channel 417, and the second valve element 481.

As illustrated in FIG. 2 to FIG. 5, the gas channel defining portion 434 is located at the center of the cover member 43, and has an external shape of a vessel open in the +Y direction with its depth direction corresponding to the Y-axis direction. The opening of the gas channel defining portion 434 and the opening 428 of the surrounding portion 42 are closed by being connected in the Y-axis direction. Thus, the gas channel 430 is defined by being surrounded by the inner wall of the cover member 43 and the inner wall of the space defining portion 427. The gas channel 430 is configured such that the cathode off-gas and the cathode reactive gas flowing into the cover member 43 come into contact with the first discharge channel 415, the first valve element 471 described later, the second discharge channel 417, and the second valve element 481 described later and do not come into contact with a first driver 479 and a second driver 489 described later.

One end of the first inlet 431 is connected to an end of the gas channel defining portion 434 in the −X direction and the −Z direction. Similarly, one end of the second inlet 432 is connected to an end of the gas channel defining portion 434 in the −X direction and the +Z direction, and one end of the outlet 433 is connected to an end of the gas channel defining portion 434 in the +X direction and the −Z direction. The first inlet 431, the second inlet 432, and the outlet 433 have cylindrical external shapes. As illustrated in FIG. 4 and FIG. 5, in this embodiment, the diameter of the second inlet 432 is smallest, the diameter of the first inlet 431 is second smallest, and the diameter of the outlet 433 is largest among the diameter of the first inlet 431, the diameter of the second inlet 432, and the diameter of the outlet 433. As illustrated in FIG. 2 and FIG. 3, a bent portion 435 is formed substantially at the center of the gas channel defining portion 434 in the X-axis direction. The bent portion 435 is bent to project toward the gas-liquid separator 41 over the entire gas channel defining portion 434 in the Z-axis direction. A flange 439 surrounds the opening of the gas channel defining portion 434. The flange 439 and the flange 429 of the surrounding portion 42 face each other in the Y-axis direction. The cover member 43 is attached to the gas-liquid separator 41 (surrounding portion 42) by fastening the flange 439 and the flange 429 with the bolts 452.

A3. Flows of Gas in Gas Channel 430

Figure 6:
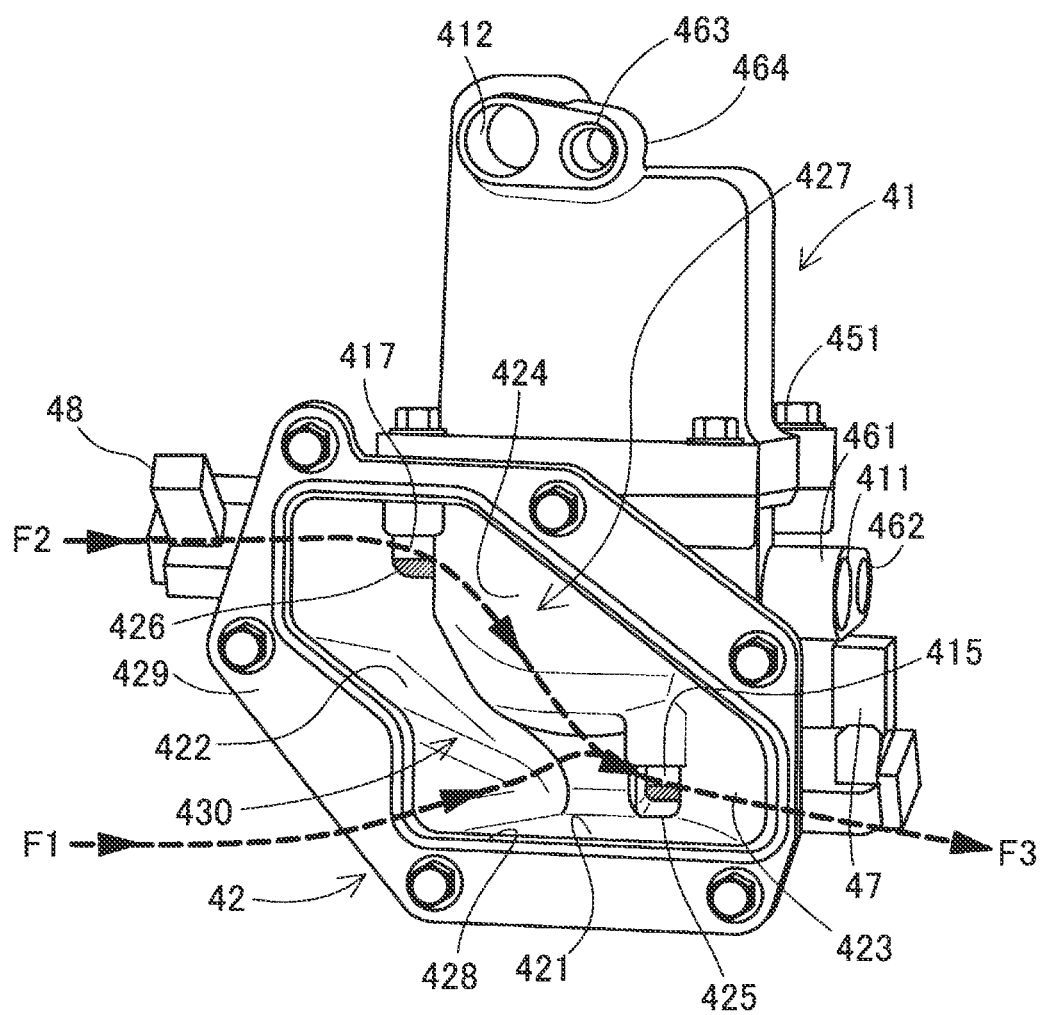
FIG. 6 is an explanatory drawing illustrating flows of gas in a gas channel.

FIG. 6 is an explanatory drawing illustrating flows of gas in the gas channel 430. For convenience of the description, FIG. 6 illustrates a state in which the cover member 43 is removed from the gas-liquid separator set 40, that is, illustrates only the gas-liquid separator 41 of the gas-liquid separator set 40.

The flow F1 of the cathode off-gas entering the gas channel 430 through the first inlet 431 and the flow F2 of the air (air passing through the bypass channel 306) entering the gas channel 430 through the second inlet 432 merge in the gas channel 430 into the flow F3 of the gas mixture. The flow F3 is discharged through the outlet 433. Since the second inlet 432 is provided at the end of the gas channel defining portion 434 in the −X direction and the +Z direction, the flow F2 is located in the vicinity of the second opening 426 provided at an end of the space defining portion 427 in the −X direction and the +Z direction. Therefore, the flow F2 directly comes into contact with the second discharge channel 417 and the second valve element 481 described later that are exposed from the second opening 426. Thus, the temperatures of the second discharge channel 417 including a second valve seat 418 described later and the second valve element 481 described later are increased due to direct contact with a relatively high-temperature cathode off-gas.

The flow F2 passing through the vicinity of the second opening 426 moves downward along the inner wall of the space defining portion 427 (left side face 422). Since the first inlet 431 is provided at the end of the gas channel defining portion 434 in the −X direction and the −Z direction, the flow F1 moves in the +X direction and, as described later, in the +Y direction along an area in the −Z direction in the gas channel 430. The flow F1 merges with the descending flow F2 into the flow F3. That is, the flow F3 is a flow of a gas mixture containing the cathode off-gas and the air bypassing the fuel cell 20. The flow F3 is located in the vicinity of the first opening 425. Therefore, the flow F3 directly comes into contact with the first discharge channel 415 and the first valve element 471 described later that are exposed from the first opening 425. Thus, the temperatures of the first discharge channel 415 including a valve seat 416 described later and the first valve element 471 described later are increased due to direct contact with the gas mixture containing the relatively high-temperature cathode off-gas. The gas mixture contains air whose temperature is increased through adiabatic compression in the air compressor 32 and is higher than a freezing point despite subsequent cooling by the intercooler 33. The temperatures of the first discharge channel 415 and the first valve element 471 are easily increased because the first discharge channel 415 and the first valve element 471 obtain more heat by contact with more gas rather than direct contact with the cathode off-gas alone.

Figure 7:
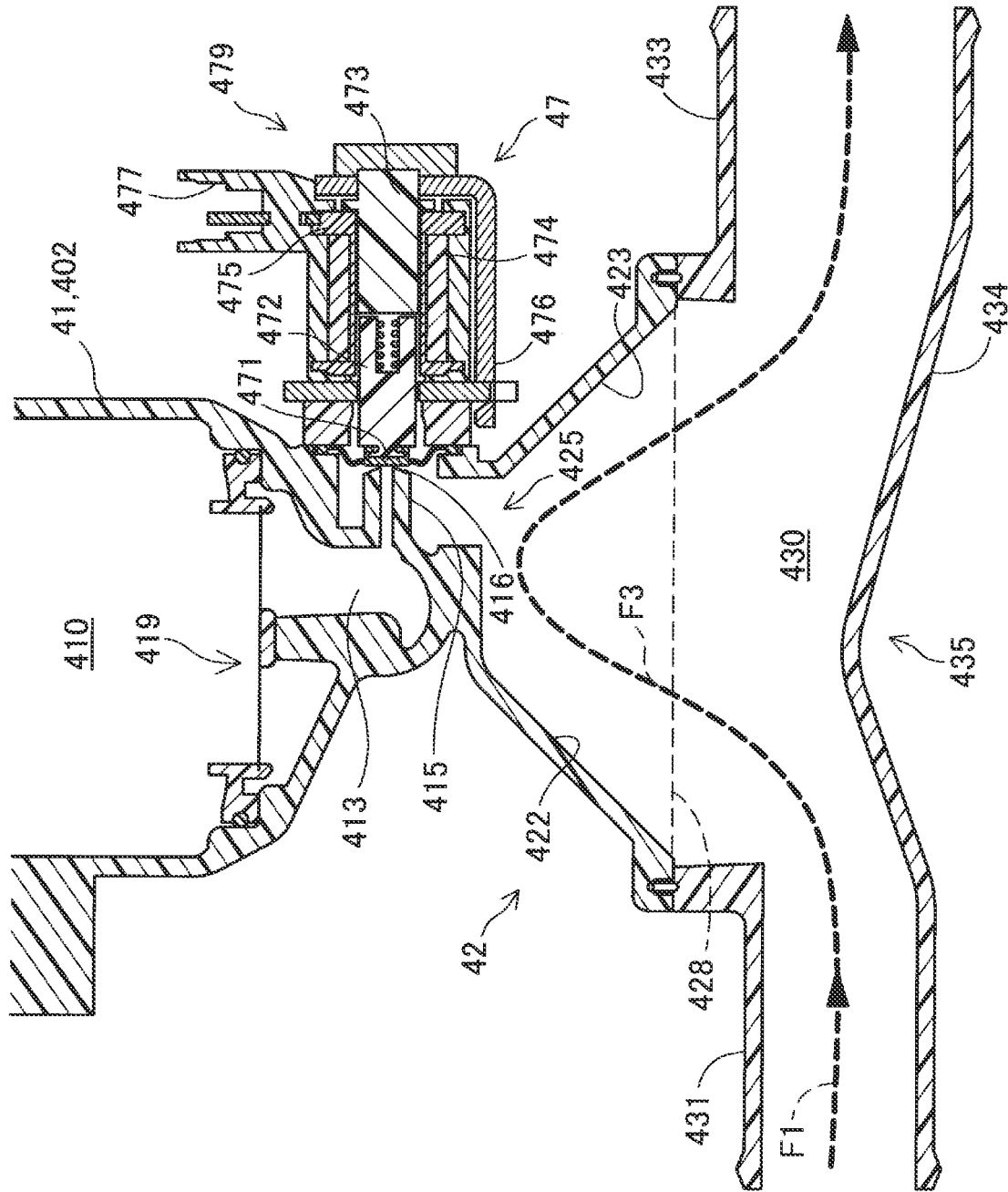
FIG. 7 is a local sectional view of the gas-liquid separator set.

FIG. 7 is a local sectional view of the gas-liquid separator set 40. FIG. 7 illustrates a cross section along a sectional line VII-VII in FIG. 5. As illustrated in FIG. 7, a filter 419 is provided inside the gas-liquid separator 41 (lower component 402). An end below the filter 419 is a tubular lower end 413 extending in the Z-axis direction. The first discharge channel 415 has a tubular external shape communicating with the side of the lower end 413 and extending in the X-axis direction. As illustrated in FIG. 7, the end of the first discharge channel 415 serves as the first valve seat 416. The first discharge channel 415 is closed when the first valve element 471 described later comes into contact with the valve seat 416.

The first valve device 47 includes the first valve element 471 and the first driver 479. The first valve element 471 is configured to come into contact with the first valve seat 416 and open or close an opening at the end of the first discharge channel 415 in the +X direction. The first driver 479 drives the first valve element 471. The first driver 479 includes a push pin 472, a plunger 473, a coil 474, a stator core 475, a yoke 476, and a connector 477. The first valve element 471 is joined to an end of the push pin 472 in the −X direction. The first valve device 47 is a normally closed valve device. In an unenergized state, the first valve element 471 is in contact with the first valve seat 416 to close the opening at the end of the first discharge channel 415. In this embodiment, the first valve element 471 is made of a resin. A magnetic force is generated by supplying a current to the coil 474 via a cable (not illustrated) connected to the connector 477, thereby forming a flow of magnetic fluxes (magnetic circuit) passing through the yoke 476, the stator core 475, and the plunger 473. Then, the push pin 472 is magnetically attracted toward the plunger 473 while resisting an urging force of a spring, and the first valve element 471 also moves toward the plunger 473 to open the opening at the end of the first discharge channel 415.

As illustrated in FIG. 7, a part of the first valve device 47 that is exposed from the first opening 425 is only the first valve element 471 made of the resin. Therefore, the first driver 479 including metal components such as the coil 474 is not exposed from the first opening 425. Thus, progress of corrosion of the first driver 479 can be suppressed by suppressing direct contact of the flow F3 of the gas mixture with the first driver 479.

As illustrated in FIG. 7, the flow F1 of the cathode off-gas flowing through the first inlet 431 first moves in the +X direction, and is guided by the bent portion 435 of the gas channel defining portion 434 to move toward the gas-liquid separator 41 (surrounding portion 42) (in the +Y direction). Therefore, the flow F3 obtained by merging the flow F1 and the flow F2 afterwards moves toward the first opening 425. Thus, the flow F3 directly comes into contact with the first discharge channel 415 and the first valve element 471 exposed from the first opening 425.

As illustrated in FIG. 7, the inner wall of the surrounding portion 42 is tapered from the opening 428 to the first opening 425. Thus, a more gas mixture can be moved toward the first opening 425, and the temperatures of the first discharge channel 415 and the first valve element 471 exposed from the first opening 425 can be increased earlier.

Figure 8:
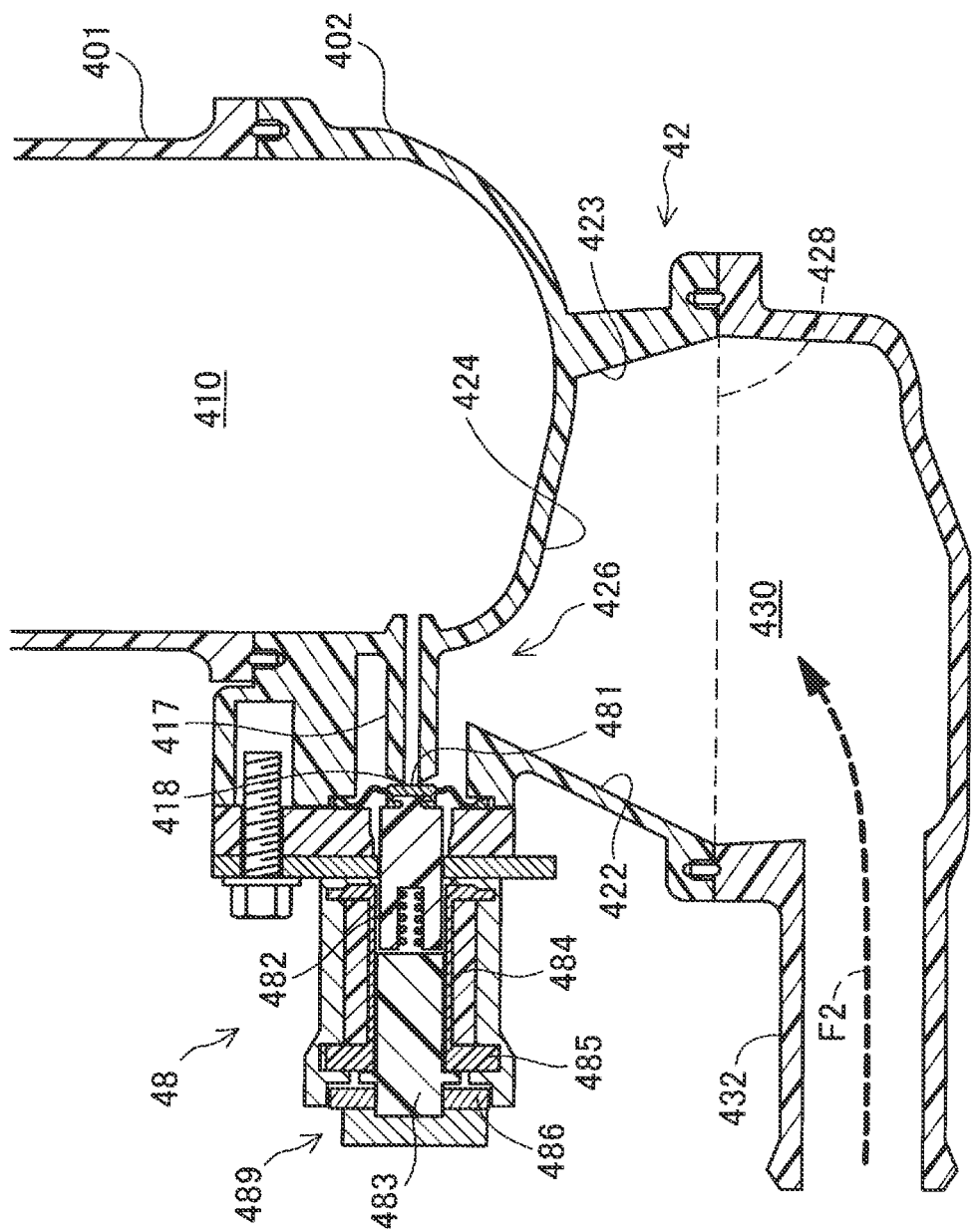
FIG. 8 is a local sectional view of the gas-liquid separator set.

FIG. 8 is a local sectional view of the gas-liquid separator set 40. FIG. 8 illustrates a cross section along a sectional line VIII-VIII in FIG. 4. The second valve device 48 has a structure similar to that of the first valve device 47. Specifically, the second valve device 48 includes the second valve element 481 and the second driver 489. The second valve element 481 is configured to come into contact with the second valve seat 418 and open or close an opening at an end of the second discharge channel 417 in the −X direction. The second driver 489 drives the second valve element 481. The second driver 489 includes a push pin 482, a plunger 483, a coil 484, a stator core 485, and a yoke 486. The second valve element 481 is joined to an end of the push pin 482 in the +X direction. The second valve device 48 is a normally closed valve device similarly to the first valve device 47. In an unenergized state, the second valve element 481 made of a resin is in contact with the second valve seat 418 to close the opening at the end of the second discharge channel 417. A magnetic force is generated by supplying a current to the coil 484 via the cable (not illustrated) connected to the connector (not illustrated), thereby forming a flow of magnetic fluxes (magnetic circuit) passing through the yoke 486, the stator core 485, and the plunger 483. Then, the push pin 482 is magnetically attracted toward the plunger 483 while resisting an urging force of a spring, and the second valve element 481 also moves toward the plunger 483 to open the opening at the end of the second discharge channel 417.

As illustrated in FIG. 8, a part of the second valve device 48 that is exposed from the second opening 426 is only the second valve element 481 made of the resin. Therefore, the second driver 489 including metal components such as the coil 484 is not exposed from the second opening 426. Thus, progress of corrosion of the second driver 489 can be suppressed by suppressing direct contact of the flow F2 of the air with the second driver 489.

As illustrated in FIG. 8, the inner wall of the surrounding portion 42 is tapered from the opening 428 to the second opening 426. Thus, more air can be moved toward the second opening 426, and the temperatures of the second discharge channel 417 and the second valve element 481 exposed from the second opening 426 can be increased earlier.

Figure 9:
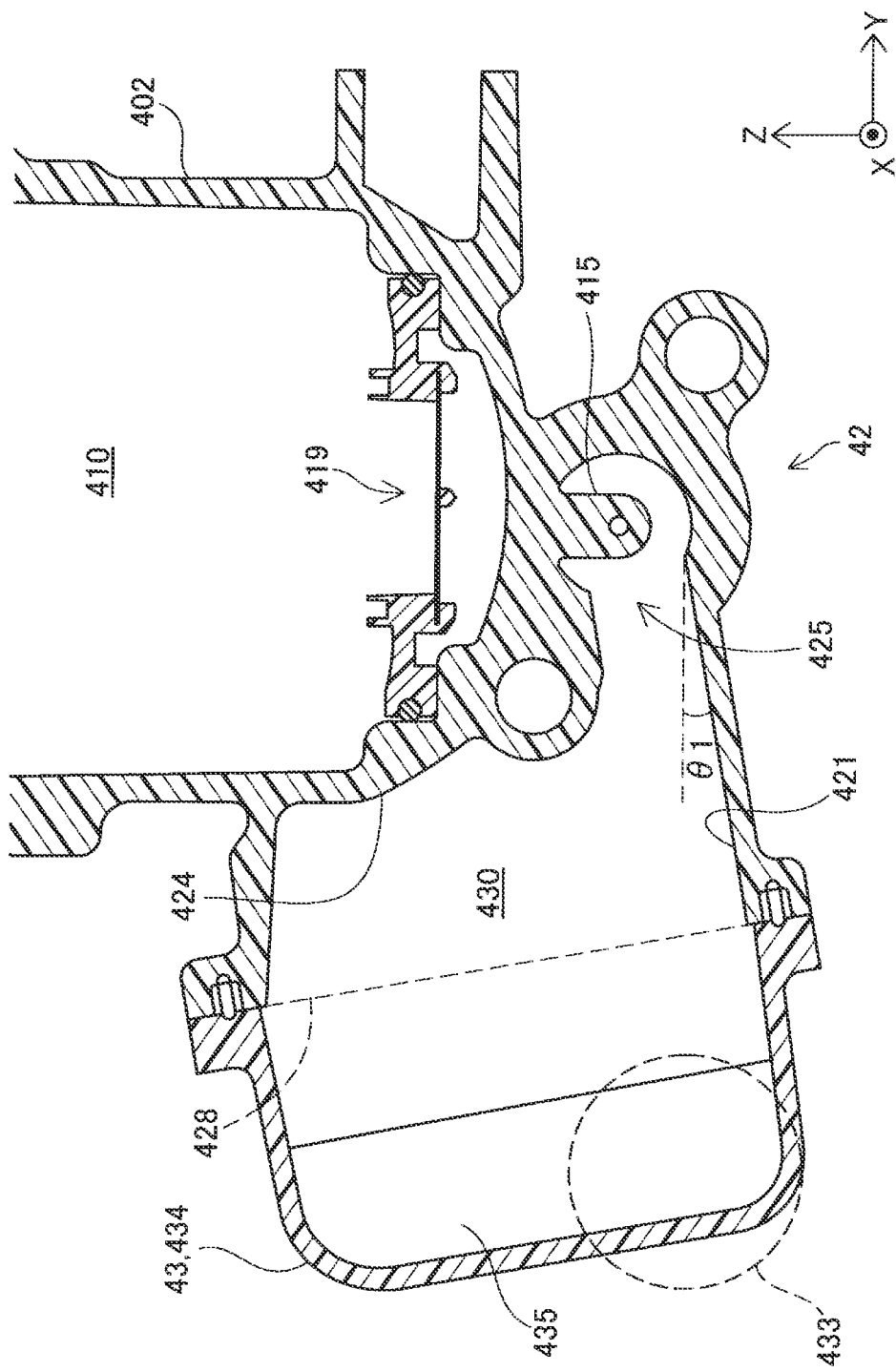
FIG. 9 is a local sectional view of the gas-liquid separator set.

FIG. 9 is a local sectional view of the gas-liquid separator set 40. FIG. 9 illustrates a cross section along a sectional line IX-IX in FIG. 2. In FIG. 9, the position of the outlet 433 is indicated by a dashed line for convenience of the description.

As illustrated in FIG. 9, the bottom face 421 of the surrounding portion 42 is inclined downward with decreasing distance to the cover member 43. In this embodiment, an inclination angle θ1 is 10°. The inclination angle θ1 is not limited to 10°, and may be any angle. With this structure, water discharged from the first discharge channel 415 can be moved toward the cover member 43. In this embodiment, the bottom face of the gas channel defining portion 434 is similarly inclined. Since the outlet 433 is connected to an end of the gas channel defining portion 434 in the −Y direction and the −Z direction, the water flowing from the surrounding portion 42 toward the cover member 43 can easily be discharged through the outlet 433 together with the gas mixture.

Figure 10:
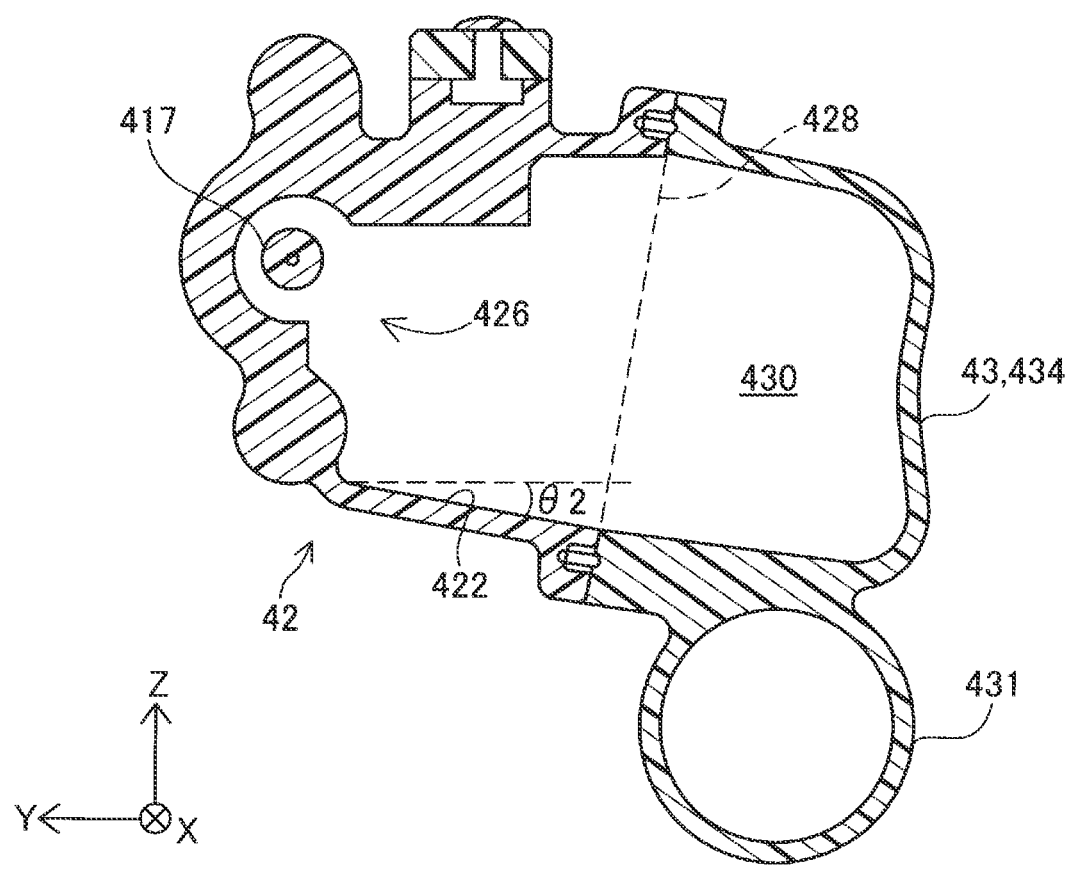
FIG. 10 is a local sectional view of the gas-liquid separator set.

FIG. 10 is a local sectional view of the gas-liquid separator set 40. FIG. 10 illustrates a cross section along a sectional line X-X in FIG. 2. As illustrated in FIG. 10, the left side face 422 of the surrounding portion 42 is inclined downward with decreasing distance to the cover member 43 in the vicinity of the second opening 426. In this embodiment, an inclination angle θ2 is 10°. The inclination angle θ2 is not limited to 10°, and may be any angle. With this structure, water discharged from the second opening 426 can be moved toward the cover member 43. Examples of the water discharged from the second opening 426 include water condensed in the vicinity of the second discharge channel 417 during a stop of the fuel cell system 10 and discharged by being blown together with the gas discharged from the second discharge channel 417.

According to the fuel cell system 10 of the first embodiment, the gas channel 430 defined by the cover member 43 is configured such that the cathode off-gas flowing into the cover member 43 comes into contact with the first discharge channel 415 and the first valve seat 416 and does not come into contact with the first driver 479. Therefore, the progress of corrosion of the first driver 479 can be suppressed while suppressing freezing of the first valve device 47 by warming the first discharge channel 415 and the first valve seat 416 by using the cathode off-gas flowing into the cover member 43. Thus, it is possible to improve the durability of the fuel cell system 10 including the first valve device 47 and the reliability of the operation of the first valve device 47.

The fuel cell system 10 includes the second discharge channel 417 connected to the body 410 of the gas-liquid separator 41 above the first discharge channel 415. Therefore, the anode off-gas can be discharged from the second discharge channel 417 even in a situation in which the anode off-gas cannot be discharged from the first discharge channel 415 because the first discharge channel 415 or the first valve seat 416 is frozen due to water stored in the body 410. The cover member 43 covers the second discharge channel 417 and the second valve seat 418. Therefore, the second discharge channel 417 and the second valve seat 418 can be warmed in addition to the first discharge channel 415 and the first valve seat 416 by using the cathode off-gas flowing into the cover member 43.

The second discharge channel 417 is connected to the body 410 of the gas-liquid separator 41 above the water level Lv indicating the maximum water storage amount expected in the body 410. Therefore, it is possible to suppress freezing of the second discharge channel 417 and the second valve seat 418 by reducing the occurrence of a case where water stored in the body 410 comes into contact with the second discharge channel 417.

The cover member 43 is connected to the bypass channel 306, and the cathode reactive gas flows into the gas channel 430 from the bypass channel 406. Therefore, the cathode reactive gas passing through the bypass channel 406 can be introduced into the cover member 43, and the first discharge channel 415 and the first valve seat 416 can further be warmed by using the cathode reactive gas. The cathode reactive gas passing through the bypass channel 306 does not contribute to electric power generation in the fuel cell 20. Therefore, the flow rate of the cathode reactive gas can freely be controlled independently of the status of electric power generation in the fuel cell 20. According to the fuel cell system 10 of this embodiment, the temperature increase of the first discharge channel 415 and the first valve seat 416 can be controlled accurately.

The gas channel 430 is configured such that the cathode reactive gas flowing into the cover member 43 from the bypass channel 306 comes into contact with the first discharge channel 415, the first valve seat 416, the second discharge channel 417, and the second valve seat 418 and does not come into contact with the first driver 479 and the second driver 489. Therefore, the first discharge channel 415, the first valve seat 416, the second discharge channel 417, and the second valve seat 418 can directly be warmed by using the cathode reactive gas flowing into the cover member 43.

The bottom face 421 of the surrounding portion 42 is inclined downward with decreasing distance to the cover member 43. Therefore, water discharged from the first discharge channel 415 can be moved to the cover member 43 and easily discharged through the outlet 433 together with the cathode off-gas.

The first discharge channel 415 and the discharge channel 308 are connected not by a channel but by the cover member 43 and the surrounding portion 42. In addition, a relatively high-temperature cathode off-gas and air passing through the bypass channel 306 flow into the gas channel 430 defined by the cover member 43 and the surrounding portion 42. According to the fuel cell system 10, there is no need to provide heating means such as a heater so that water discharged from the first discharge channel 415 is not frozen midway to the discharge channel 308. Thus, it is possible to downsize the fuel cell system 10 and reduce costs for construction and operation of the fuel cell system 10.

B. Second Embodiment

Figure 11:
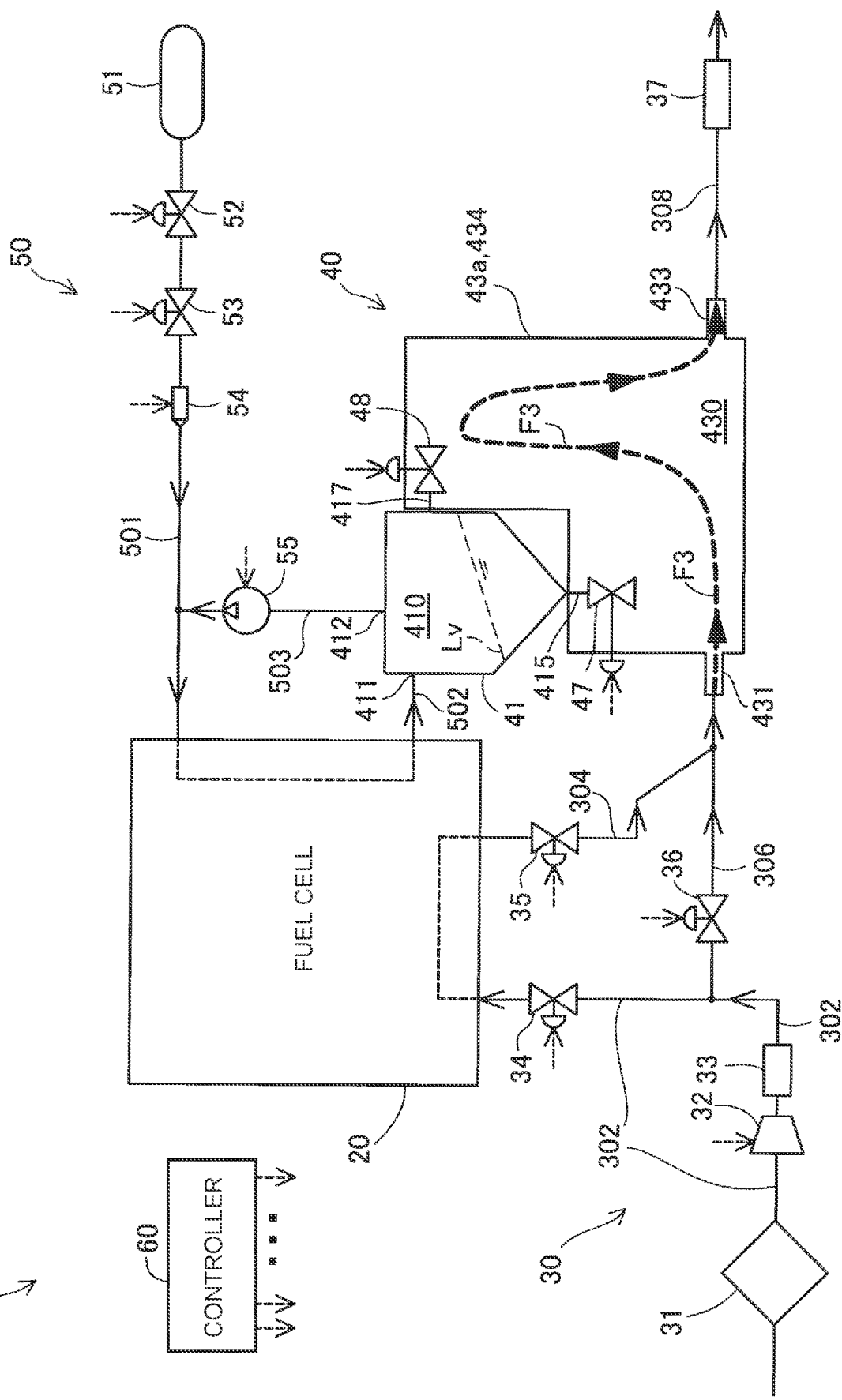
FIG. 11 is a block diagram illustrating the overall structure of a fuel cell system according to a second embodiment.

FIG. 11 is a block diagram illustrating the overall structure of a fuel cell system 10a according to a second embodiment. The fuel cell system 10a of the second embodiment differs from the fuel cell system 10 of the first embodiment in that a cover member 43a is provided in place of the cover member 43 and the bypass channel 306 is connected to the cathode off-gas discharge channel 304 in place of the cover member 43. The other structure of the fuel cell system 10a of the second embodiment is the same as that of the fuel cell system 10 of the first embodiment. Therefore, the same components are represented by the same reference symbols to omit their detailed description.

The cover member 43a differs from the cover member 43 of the first embodiment in that the second inlet 432 is omitted. The other structure of the cover member 43a is the same as that of the cover member 43. Therefore, the same components are represented by the same reference symbols to omit their detailed description.

The bypass channel 306 is connected to the cathode off-gas discharge channel 304 on an upstream side of a portion connected to the first inlet 431 in the cathode off-gas discharge channel 304. Therefore, a gas mixture containing the cathode off-gas and air flowing into the bypass channel 306 flows into the gas channel 430 through the first inlet 431. As illustrated in FIG. 11, the flow F3 of the gas mixture is generated at the first inlet 431 in the gas channel 430.

The fuel cell system 10a of the second embodiment attains effects similar to those of the fuel cell system 10 of the first embodiment. In addition, the bypass channel 306 is connected to the upstream side of the portion connected to the cover member 43 in the cathode off-gas discharge channel 304, and the gas channel 430 is configured such that the gas mixture flowing into the gas channel 430 and containing the cathode off-gas and the cathode reactive gas passing through the bypass channel 306 comes into contact with the first discharge channel 415, the first valve seat 416, the second discharge channel 417, and the second valve seat 418 and does not come into contact with the first driver 479 and the second driver 489. Therefore, the first discharge channel 415, the first valve seat 416, the second discharge channel 417, and the second valve seat 418 can be warmed by using the gas mixture flowing into the cover member 43, and the progress of corrosion of the first driver 479 and the second driver 489 can be suppressed. The cathode reactive gas passing through the bypass channel 306 does not contribute to electric power generation in the fuel cell 20. Therefore, the flow rate of the cathode reactive gas can freely be controlled independently of the status of electric power generation in the fuel cell 20. According to the fuel cell system 10a of the second embodiment, the temperature increase of the first discharge channel 415, the first valve seat 416, the second discharge channel 417, and the second valve seat 418 can be controlled accurately.

C. Other Embodiments (C1) In the gas-liquid separator 41 of each embodiment, the second discharge channel 417 and the second valve device 48 may be omitted. Also in this structure, the first discharge channel 415 and the first valve seat 416 can be warmed by using the cathode off-gas and the air passing through the bypass channel 306.

(C2) In each embodiment, the second discharge channel 417 is connected to the body 410 above the water level indicating the maximum water storage amount expected in the body 410, in particular, above the upper end of the water surface Lv in the case where the vehicle travels along the road having the maximum expected inclination. The present disclosure is not limited to this case. For example, the second discharge channel 417 may be connected to the body 410 above a water level indicating a maximum storage amount in the body 410 in a case where the vehicle travels along a flat road. Further, the second discharge channel 417 may be arranged below the water level indicating the maximum storage amount in the body 410.

(C3) In each embodiment, the bypass channel 306 may be omitted. Also in this structure, the first discharge channel 415, the first valve seat 416, the second discharge channel 417, and the second valve seat 418 can be warmed by using the cathode off-gas flowing into the gas channel 430 through the first inlet 431 via the cathode off-gas discharge channel 304. In this structure, the second inlet 432 may be omitted in the cover member 43.

(C4) In each embodiment, the gas channel defining portion 434 defines, as the gas channel 430, the channel configured such that the air flowing through the second inlet 432 comes into contact with the first discharge channel 415, the first valve element 471, the second discharge channel 417, and the second valve element 481. The present disclosure is not limited to this case. For example, the air flowing through the second inlet 432 may be caused to directly come into contact with the first discharge channel 415 and the first valve element 471 and not to directly come into contact with the second discharge channel 417 and the second valve element 481 similarly to the cathode off-gas flowing through the first inlet 431. Also in this structure, the second discharge channel 417 and the second valve element 481 can be warmed by using radiation heat on the inner wall of the gas channel defining portion 434 and the inner wall of the space defining portion 427.

(C5) In each embodiment, the bottom face 421 of the surrounding portion 42 is inclined downward with decreasing distance to the cover member 43. The present disclosure is not limited to this case. The bottom face 421 may be parallel to the horizon plane or inclined upward with decreasing distance to the cover member 43.

(C6) In the first embodiment, the first inlet 431 out of the first inlet 431 and the second inlet 432 is located on the lower side, and the second inlet 432 out of the first inlet 431 and the second inlet 432 is located on the upper side. Instead, the first inlet 431 may be located on the upper side, and the second inlet 432 may be located on the lower side. According to this structure, the cathode off-gas flowing into the gas channel 430 through the first inlet 431 via the cathode off-gas discharge channel 304 passes through the vicinity of the second opening 426. Therefore, the cathode off-gas can directly come into contact with the second discharge channel 417 and the second valve element 481 in addition to the first discharge channel 415 and the first valve element 471. The temperature of the cathode off-gas is high because the cathode off-gas is discharged from the inside of the fuel cell 20. This structure attains such an effect that the temperature increase rate can be improved by warming the second discharge channel 417 and the second valve element 481 more efficiently.

(C7) In each embodiment, the gas channel defining portion 434 has the bent portion 435, but the bent portion 435 may be omitted. Further, a bent portion may be provided in the vicinity of the second opening 426 in place of or in addition to the bent portion 435. Similarly to the bent portion 435, the bent portion provided in the vicinity of the second opening 426 may be bent to guide, toward the second opening 426, the air flowing through the second inlet 432 in the first embodiment and the gas mixture flowing through the first inlet 431 in the second embodiment. According to this structure, the temperature increase rate can be improved by warming the second discharge channel 417 and the second valve seat 418 exposed from the second opening 426 more efficiently.

(C8) In each embodiment, each of the fuel cell systems 10 and 10a is used by being mounted on the vehicle as the system for supplying electric power to the traction motor and the auxiliary devices. The present disclosure is not limited to this case. For example, each of the fuel cell systems 10 and 10a may be used by being mounted on, in place of the vehicle, a ship, an aircraft, or any other type of moving object that requires a driving power supply. Each of the fuel cell systems 10 and 10a may be used also as a stationary power supply. Each single cell of the fuel cell 20 is the polymer electrolyte fuel cell, but may be various types of fuel cell such as a phosphoric acid fuel cell, a molten carbonate fuel cell, or a solid oxide fuel cell.

(C9) In each embodiment, the first valve element 471 need not be exposed from the first opening 425. Further, the second valve element 481 need not be exposed from the second opening 426. Also in those structures, the first discharge channel 415 and the valve seat 416 are exposed from the first opening 425. Thus, freezing of those components can be suppressed. Similarly, the second discharge channel 417 and the second valve seat 418 are exposed from the second opening 426. Thus, freezing of those components can be suppressed.

The present disclosure is not limited to the embodiments described above, but may be implemented by various structures without departing from the gist of the present disclosure. For example, the technical features of the embodiments corresponding to the technical features of the respective aspects described in the "SUMMARY" section may be replaced or combined as appropriate to solve a part or all of the problems described above or attain a part or all of the effects described above. Any technical feature may be omitted as appropriate unless otherwise described as being essential herein.

What is claimed is:

1. A fuel cell system comprising:
   a fuel cell;
   a cathode off-gas discharge channel connected to the fuel cell, and configured such that a cathode off-gas discharged from the fuel cell passes through the cathode off-gas discharge channel;
   a gas-liquid separator configured such that an anode off-gas discharged from the fuel cell flows into the gas-liquid separator and water is separated from the anode off-gas, the gas-liquid separator including:
      a hollow body configured to store the water;
      a first discharge channel connected to a lower part of the body, including a first valve seat at an end of the first discharge channel, and configured to discharge at least the water stored in the body; and
      a first valve device including a first valve element configured to come into contact with the first valve seat and adjust an opening degree of the first discharge channel, and a first driver configured to drive the first valve element; and
   a cover member configured to cover at least the first discharge channel and the first valve seat in the gas-liquid separator, and including a gas channel defining portion that defines a gas channel communicating with the cathode off-gas discharge channel between the cover member and the gas-liquid separator,
   wherein the gas channel is configured such that the cathode off-gas flowing into the cover member comes into contact with the first discharge channel and the first valve seat and does not come into contact with the first driver.

2. The fuel cell system according to claim 1, wherein:
   the gas-liquid separator further includes:
      a second discharge channel connected to the body above the first discharge channel, including a second valve seat at an end of the second discharge channel, and configured to discharge at least a gas component in the anode off-gas; and
      a second valve device including a second valve element configured to come into contact with the second valve seat and adjust an opening degree of the second discharge channel, and a second driver configured to drive the second valve element; and
   the cover member is configured to further cover the second discharge channel and the second valve seat.

3. The fuel cell system according to claim 2, wherein the second discharge channel is connected to the body above a water level indicating a predetermined water storage amount in the body.

4. The fuel cell system according to claim 3, further comprising:
   a cathode reactive gas supply device configured to supply a cathode reactive gas to the fuel cell;
   a cathode reactive gas supply channel connecting the cathode reactive gas supply device and the fuel cell, and configured to guide the cathode reactive gas to the fuel cell; and
   a bypass channel connected to the cathode reactive gas supply channel, and configured such that the cathode reactive gas supplied from the cathode reactive gas supply device passes through the bypass channel without passing through the fuel cell, wherein:
   the cover member is connected to the bypass channel;
   the gas channel is configured such that the cathode reactive gas flows into the gas channel from the bypass channel; and
   the gas channel is configured such that the cathode reactive gas flowing into the cover member from the bypass channel comes into contact with the first discharge channel, the first valve seat, the second discharge channel, and the second valve seat and does not come into contact with the first driver and the second driver.

5. The fuel cell system according to claim 2, further comprising:
   a cathode reactive gas supply device configured to supply a cathode reactive gas to the fuel cell;
   a cathode reactive gas supply channel connecting the cathode reactive gas supply device and the fuel cell, and configured to guide the cathode reactive gas to the fuel cell; and
   a bypass channel connected to the cathode reactive gas supply channel, and configured such that the cathode reactive gas supplied from the cathode reactive gas supply device passes through the bypass channel without passing through the fuel cell, wherein:

the cover member is connected to the bypass channel;

the gas channel is configured such that the cathode reactive gas flows into the gas channel from the bypass channel; and the gas channel is configured such that the cathode reactive gas flowing into the cover member from the bypass channel comes into contact with the first discharge channel, the first valve seat, the second discharge channel, and the second valve seat and does not come into contact with the first driver and the second driver.

6. The fuel cell system according to claim 1, further comprising:

a cathode reactive gas supply device configured to supply a cathode reactive gas to the fuel cell;

a cathode reactive gas supply channel connecting the cathode reactive gas supply device and the fuel cell, and configured to guide the cathode reactive gas to the fuel cell; and a bypass channel connected to the cathode reactive gas supply channel, and configured such that the cathode reactive gas supplied from the cathode reactive gas supply device passes through the bypass channel without passing through the fuel cell, wherein:

the cover member is connected to the bypass channel; and the gas channel is configured such that the cathode reactive gas flows into the gas channel from the bypass channel.

7. The fuel cell system according to claim 1, further comprising:

a cathode reactive gas supply device configured to supply a cathode reactive gas to the fuel cell;

a cathode reactive gas supply channel connecting the cathode reactive gas supply device and the fuel cell, and configured to guide the cathode reactive gas to the fuel cell; and a bypass channel connected to the cathode reactive gas supply channel, and configured such that the cathode reactive gas supplied from the cathode reactive gas supply device passes through the bypass channel without passing through the fuel cell, wherein:

the bypass channel is connected to the cathode off-gas discharge channel on an upstream side of a portion connected to the cover member in the cathode off-gas discharge channel; and the gas channel is configured such that a gas mixture flowing into the gas channel and containing the cathode off-gas and the cathode reactive gas passing through the bypass channel comes into contact with the first discharge channel and the first valve seat and does not come into contact with the first driver.

8. The fuel cell system according to claim 1, wherein:

the gas-liquid separator further includes a surrounding portion projecting from a side of the body, having an opening, and configured to surround the first discharge channel and the first valve seat;

the cover member faces the surrounding portion, and is connected to the gas-liquid separator to close the opening; and a bottom face of the surrounding portion is inclined downward with decreasing distance to the cover member.

* * * * *

UNITED STATES PATENT AND TRADEMARK OFFICE
CERTIFICATE OF CORRECTION

PATENT NO. : 11,637,297 B2
APPLICATION NO. : 17/450281
DATED : April 25, 2023
INVENTOR(S) : Takami Hosoi et al.

Page 1 of 1

It is certified that error appears in the above-identified patent and that said Letters Patent is hereby corrected as shown below:

On the Title Page

Column 1, item (73) please change the assignees to:
--TOYOTA JIDOSHA KABUSHIKI KAISHA, Toyota-shi, (JP); AISIN CORPORATION, Kariya-shi (JP)--

Signed and Sealed this
Twenty-fifth Day of July, 2023

Katherine Kelly Vidal
*Director of the United States Patent and Trademark Office*